(12) United States Patent
Atchley et al.

(10) Patent No.: US 8,641,328 B2
(45) Date of Patent: Feb. 4, 2014

(54) ALIGNMENT WINDOW FOR DRIVE TOOL ASSEMBLY

(75) Inventors: Jacob C. Atchley, Columbia, MO (US); Kelly S. Hawkins, Centralia, MO (US); Daniel V. Hamilton, Centralia, MO (US)

(73) Assignee: Hubbell Incorporated, Shelton, CT (US)

( * ) Notice: Subject to any disclaimer, the term of this patent is extended or adjusted under 35 U.S.C. 154(b) by 33 days.

(21) Appl. No.: 13/354,784

(22) Filed: Jan. 20, 2012

(65) Prior Publication Data

US 2013/0189040 A1    Jul. 25, 2013

(51) Int. Cl.
*E21B 17/03* (2006.01)

(52) U.S. Cl.
USPC ......... 405/252.1; 405/232; 175/320; 403/361

(58) Field of Classification Search
USPC .............. 405/230, 231, 232, 250, 251, 252.1, 405/253, 254; 403/355, 361; 175/320
See application file for complete search history.

(56) References Cited

U.S. PATENT DOCUMENTS

| | | | |
|---|---|---|---|
| 3,377,077 A | 4/1968 | Hollander | |
| 3,664,444 A | 5/1972 | Henson | |
| 4,344,718 A | 8/1982 | Taylor | |
| 4,580,795 A | 4/1986 | Burtelson | |
| 4,646,831 A | 3/1987 | Marsh | |
| 5,145,286 A | 9/1992 | Summers | |
| 5,660,504 A * | 8/1997 | Reinert, Sr. | 405/232 |
| 5,904,447 A | 5/1999 | Sutton | |
| 5,967,693 A * | 10/1999 | Braaten et al. | 403/361 |
| 6,050,740 A | 4/2000 | Dziedzic | |
| 6,183,167 B1 * | 2/2001 | Ruiz et al. | 405/251 |
| 6,398,445 B1 | 6/2002 | Matali Badia | |
| 6,641,332 B1 * | 11/2003 | Alvarado | 405/232 |
| 6,986,495 B2 | 1/2006 | Pinkleton | |
| 7,037,045 B2 * | 5/2006 | Jones | 405/252.1 |
| 7,090,437 B2 | 8/2006 | Pinkleton | |
| 7,112,012 B2 * | 9/2006 | Whitsett | 405/233 |
| 7,188,684 B2 | 3/2007 | Nolan | |
| 7,220,081 B1 * | 5/2007 | Gantt, Jr. | 405/230 |
| 7,300,230 B2 | 11/2007 | Ong | |
| 7,353,891 B2 | 4/2008 | Nolan | |
| 7,377,723 B2 | 5/2008 | Nolan | |
| 8,061,935 B2 | 11/2011 | Weaver | |

(Continued)

OTHER PUBLICATIONS

International Search Report issued in PCT/US2013/020508 dated Mar. 8, 2013.

*Primary Examiner* — Frederick L Lagman
(74) *Attorney, Agent, or Firm* — Marcus R. Mickney; Alfred N. Goodman; Mark S. Bicks

(57) ABSTRACT

A drive tool for connecting a member to the drive tool of a drive tool assembly includes a flange connectable to the drive tool assembly. A wall has a first portion extending axially outwardly from the flange and defining a socket for receiving a first member. The wall has a second portion extending axially from the first portion of the wall and having a circumferential extent less than that of the first portion to facilitate receiving the first member by providing a laterally and axially open alignment opening. The first member can have a second portion extending axially further than a first portion and having a circumferential extent less than the first portion to facilitate connecting a second member to the first member by providing a laterally and axially open alignment opening.

20 Claims, 9 Drawing Sheets

(56) References Cited

U.S. PATENT DOCUMENTS

| | | |
|---|---|---|
| 2004/0076479 A1 | 4/2004 | Camilleri |
| 2005/0031418 A1 * | 2/2005 | Whitsett .................... 405/252.1 |
| 2006/0127188 A1 * | 6/2006 | Francis .......................... 405/231 |
| 2007/0110521 A1 | 5/2007 | Nimens |
| 2007/0231106 A1 | 10/2007 | Walker |

* cited by examiner

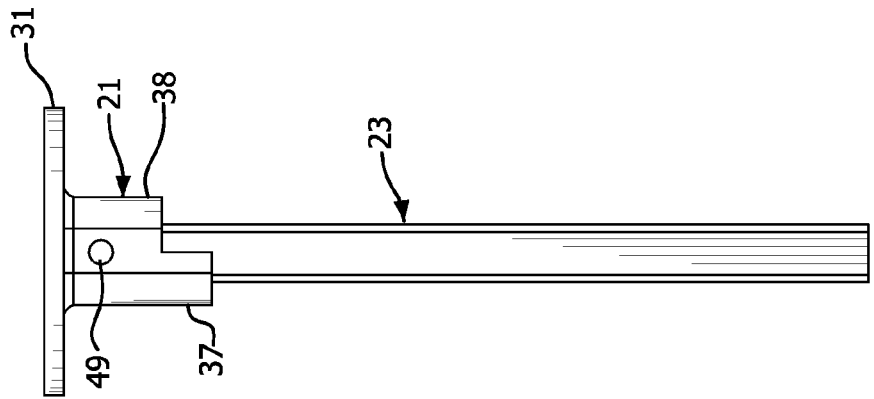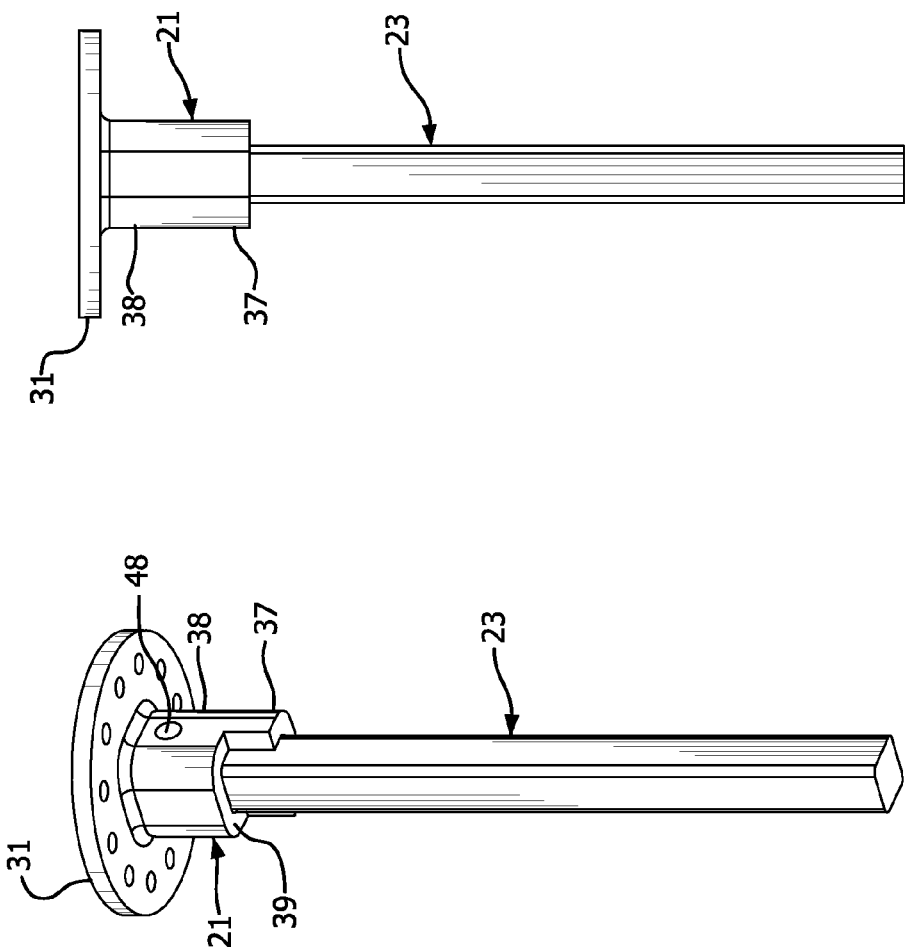

FIG.16　FIG.19　FIG. 22　FIG. 25
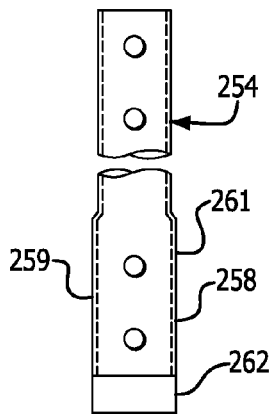 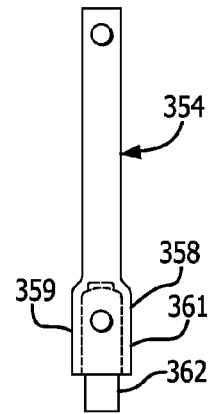 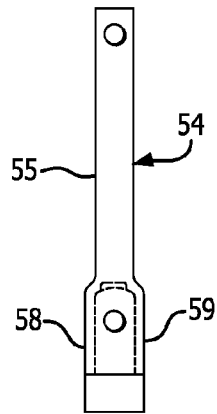 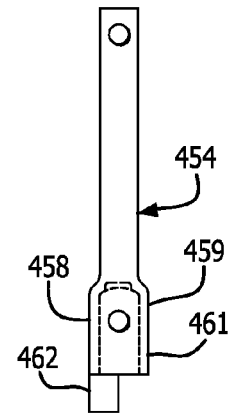
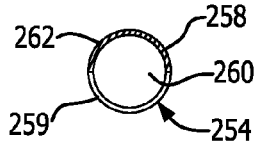 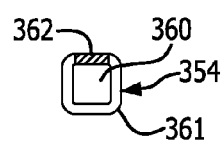 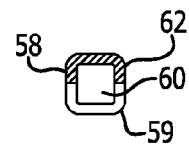 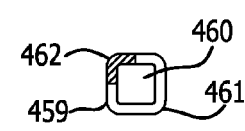
FIG.17　FIG. 20　FIG. 23　FIG. 26
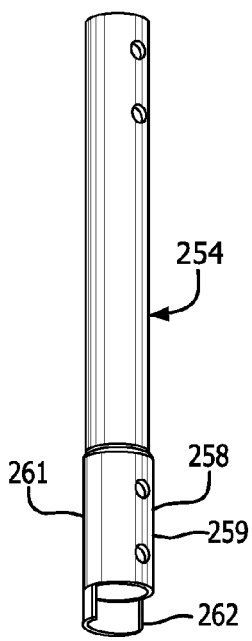 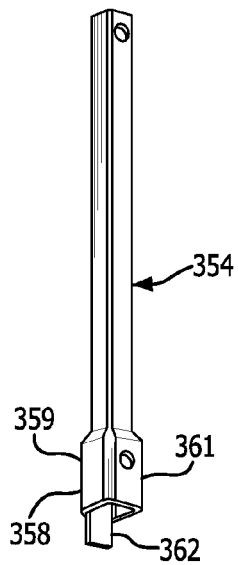 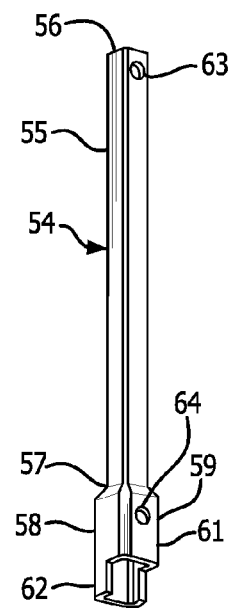 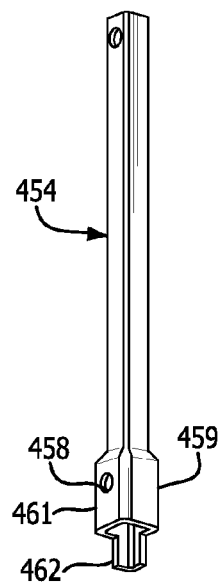
FIG.18　FIG. 21　FIG. 24　FIG. 27

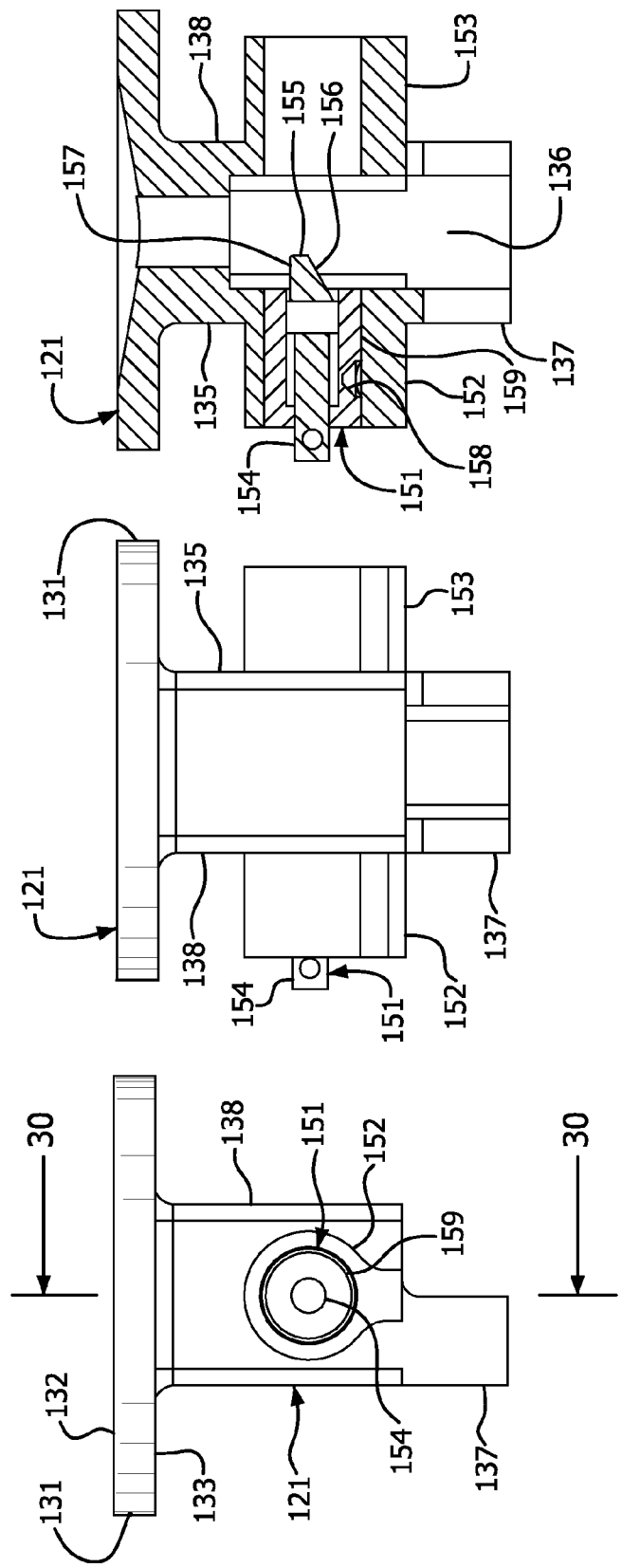

ALIGNMENT WINDOW FOR DRIVE TOOL ASSEMBLY

FIELD OF THE INVENTION

The present invention relates to an alignment window for quickly and easily connecting a helical pile thereto. More particularly, the present invention relates to an alignment window for a drive tool to facilitate aligning and connecting a helical pile to the drive tool. Still more particularly, the present invention relates to an alignment window for an extension member to facilitate aligning and connecting a helical pile to the extension member.

BACKGROUND OF THE INVENTION

A screw anchor or screw pile is used as a building foundation. The screw or pile anchor is driven into the ground and carries the structure's load. Helical bearing plates connected to the shaft of the helical pile transfer the load to the soil. A drive tool connects the helical pile to a powered drive head to screw the helical pile into the ground. Extension members can be connected between the drive tool and the helical pile to extend the length to which the anchor can be screwed into the ground.

A conventional helical pile 11 and drive tool 11 are shown in FIG. 1. An end of the helical pile 11 has openings 12 in the pipe wall that are aligned with openings 13 in the drive tool 14 such that a drive pin assembly can be inserted through the openings 12 and 13 to secure the drive tool 14 to the helical pile 11. An operator of the powered drive head machinery has difficulty connecting the drive tool 14 to the helical pile 11. An installer holds the helical pile 11 while the operator attempts to align the drive tool 14 with the helical pile 11. However, controlling the drive tool 14 to precisely align the drive tool with the helical pile 11 is difficult and requires additional assistance from the installer.

An axial end 15 of the drive tool 14 is substantially planar, i.e., the entirety of the axial end 15 is equidistant from a flange 16 of the drive tool 14, thereby creating a possible pinch point between the axial end 15 of the drive tool 14 and an axial end 17 of the helical pile 11 during alignment and insertion of the helical pile 11. The installer's fingers can be pinched between the axial ends of the drive tool and helical pile when aligning the helical pile 11 with the drive tool 14 and inserting the helical pile in the drive tool socket 18. Accordingly, a need exists for easily, quickly and safely connecting the helical pile to the drive tool.

Similar problems exist when aligning and connecting an extension member between the drive tool 14 and the helical pile 11. Extension members are connected between the drive tool 14 and the helical pile 11 to increase the overall length of a helical pile assembly. Accordingly, a need exists for quickly and safely connecting an extension member between a drive tool and an helical pile.

SUMMARY OF THE INVENTION

Accordingly, a primary objective of the present invention is to provide an improved drive tool for connecting a helical pile thereto.

A further objective of the present invention is to provide an improved drive tool having a portion of a wall extending axially further than a remaining portion of the wall to facilitate aligning a helical pile with the drive tool.

A further objective of the present invention is to provide an improved extension member for connecting a helical pile thereto.

A further objective of the present invention is to provide an improved extension member having a portion of a wall extending axially further than a remaining portion of the wall to facilitate aligning an helical pile with the extension member.

The foregoing objectives are basically attained by a drive tool for connecting a member to the drive tool of a drive tool assembly. The drive tool includes a flange connectable to the drive tool assembly. A wall having a first portion extends axially outwardly from the flange and defines a socket for receiving a first member. The wall has a second portion extending axially from the first portion of the wall and having a circumferential extent less than the first portion to facilitate receiving the first member by providing a laterally and axially open alignment opening. The axially extending portion of the wall allows the first member to be quickly and safely aligned with and inserted in the socket of the drive tool.

The foregoing objectives are also basically attained by an extension member for connecting a helical pile to a drive tool. The extension member has a body having first and second ends. The first end of the extension member is connectable to the drive tool. A socket having a first portion is formed at the second end of the body of the extension member and is connectable to the helical pile. A second portion of the socket extends axially from the first portion and has a circumferential extent less than the first portion to facilitate receiving the helical pile by providing a laterally and axially open alignment opening.

The foregoing objectives are also basically attained by a method of connecting a member to a drive tool. A first member is abutted against an axially extending portion of the drive tool. The axially extending portion has a circumferential extent less than a socket portion from which the axially extending portion extends. The first member is inserted in the socket portion of the drive tool. A locking member secures the first member to the drive tool. The first member can have an axially extending portion to facilitate connecting a second member to the first member.

Other objects, advantages and salient features of the invention will become apparent from the following detailed description, which, taken in conjunction with the annexed drawings, discloses a preferred embodiment of the invention.

As used in this application, the terms "front," "rear," "upper," "lower," "upwardly," "downwardly," and other orientational descriptors are intended to facilitate the description, and are not intended to limit the described structure to any particular position or orientation.

BRIEF DESCRIPTION OF THE DRAWINGS

The above aspects and features of the present invention will be more apparent from the description for exemplary embodiments of the present invention taken with reference to the accompanying drawing figures, in which:

FIG. 13 is a perspective view of the drive tool of FIG. 2 in which the square helical pile is fully inserted in the drive tool;

FIG. 14 is a rear elevational view of the drive tool and helical pile of FIG. 13;

FIG. 15 is a side elevational view of the drive tool and helical pile of FIG. 13;

FIG. 16 is a side elevational view of an extension member for a circular helical pile in accordance with another exemplary embodiment of the present invention;

FIG. 17 is a bottom plan view in cross section of the extension member of FIG. 16;

FIG. 18 is a perspective view of the extension member of FIG. 16;

FIG. 19 is a side elevational view of an extension member for a square helical pile having a substantially planar alignment window in accordance with another exemplary embodiment of the present invention;

FIG. 20 is a bottom plan view in cross section of the extension member of FIG. 19;

FIG. 21 is a perspective view of the extension member of FIG. 19;

FIG. 22 is a side elevational view of the extension member of FIG. 3;

FIG. 23 is a bottom plan view in cross section of the extension member of FIG. 22;

FIG. 24 is a perspective view of the extension member of FIG. 22;

FIG. 25 is a side elevational view of an extension member for a square helical pile having a substantially L-shaped alignment window in accordance with another exemplary embodiment of the present invention;

FIG. 26 is a bottom plan view in cross section of the extension member of FIG. 25;

FIG. 27 is a perspective view of the extension member of FIG. 25;

FIG. 28 is a side elevational view of a drive tool in accordance with another exemplary embodiment of the present invention;

FIG. 29 is a front elevational view of the drive tool of FIG. 28; and

FIG. 30 is a front elevational view in cross section of the drive tool taken along line 30-30 of FIG. 28.

Throughout the drawings, like reference numerals will be understood to refer to like parts, components and structures.

DETAILED DESCRIPTION OF EXEMPLARY EMBODIMENTS

Figure 1:
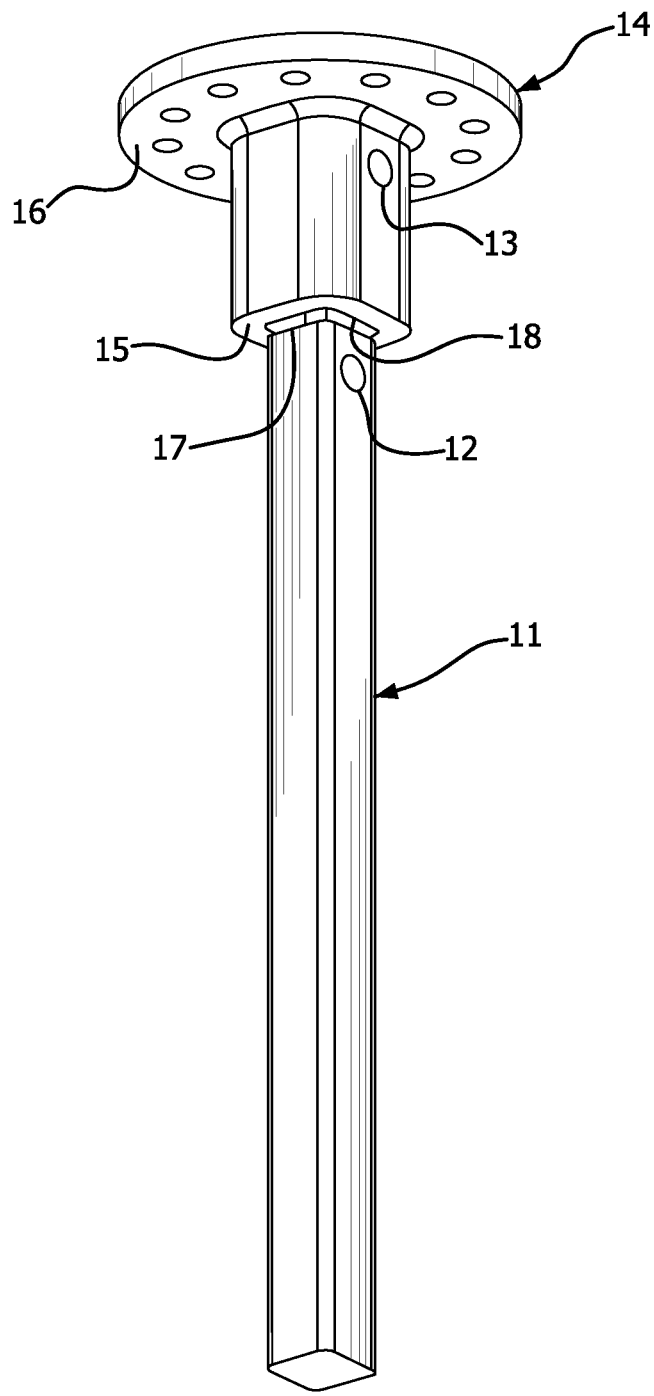
FIG. 1 is a perspective view of a conventional drive tool prior to connecting a square helical pile thereto.
Figure 2:
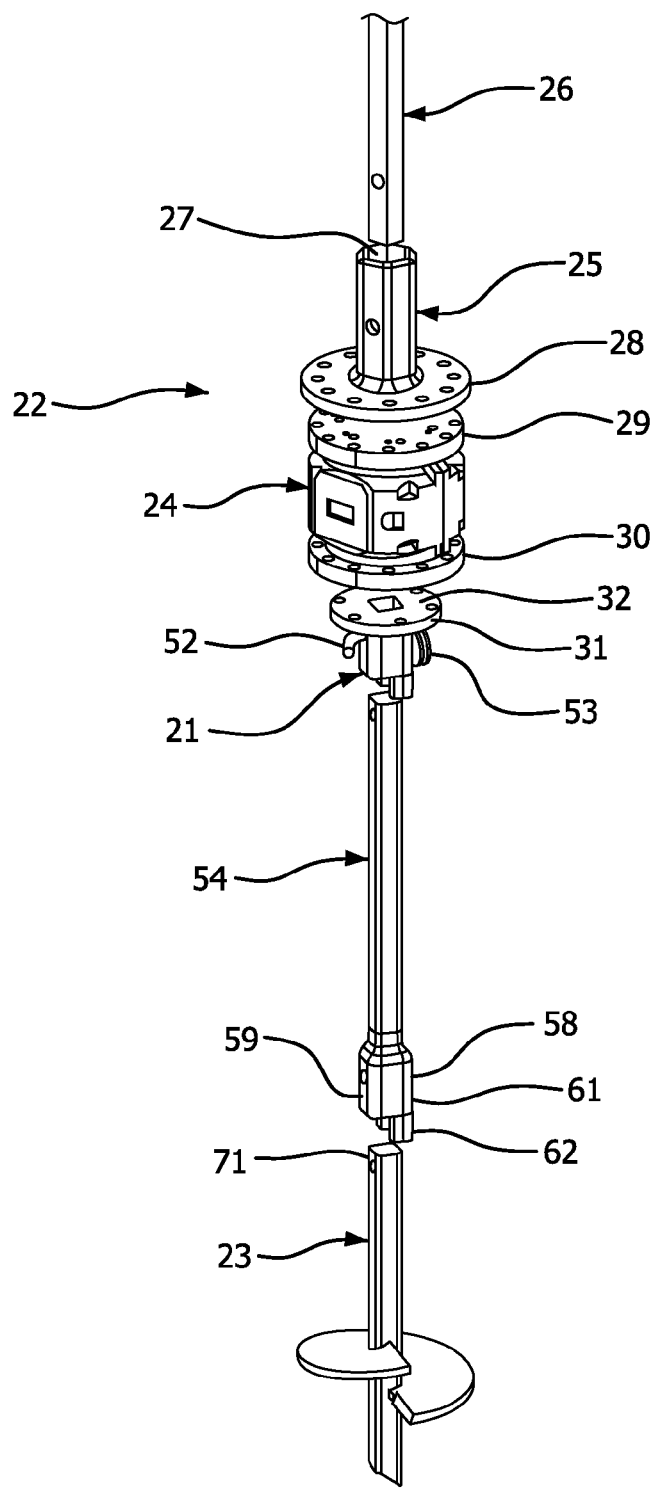
FIG. 2 is a perspective of a drive tool in accordance with an exemplary embodiment of the present invention prior to connecting a square helical pile thereto.
Figure 3:
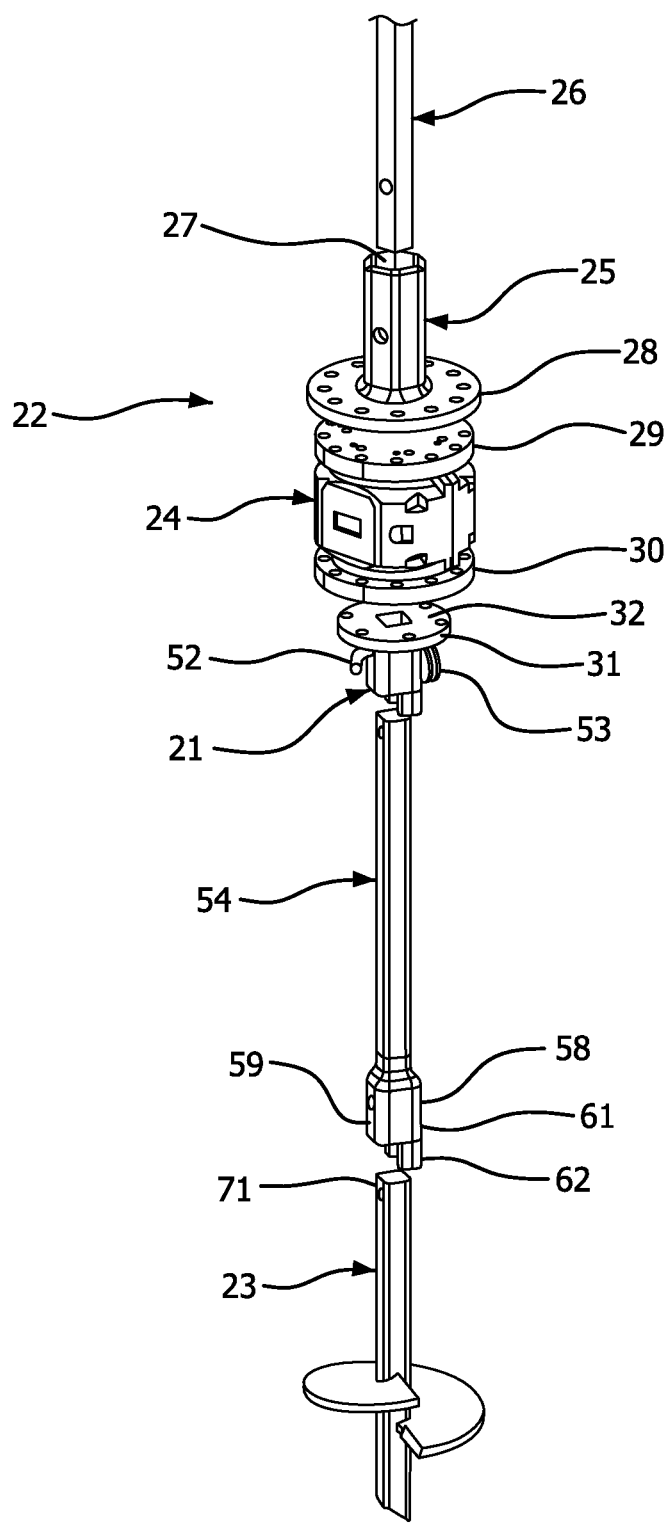
FIG. 3 is a perspective view of the drive tool of FIG. 2 prior to connecting an extension shaft, extension member and square helical pile thereto.

As shown in FIGS. 2-30, exemplary embodiments of the present invention includes a drive tool 21 of a drive assembly 22 for connecting a helical pile 23 thereto. The drive assembly 22 includes the drive tool 21, a torque indicator 24, a Kelly bar adapter 25 and a Kelly bar 26, as shown in FIGS. 2 and 3. The torque indicator 24 is optional, such that the drive tool 21 can be directly connected to the Kelly bar adapter 25.

The Kelly bar 26 is connected to a powered drive head (not shown) for transferring torque to the helical pile 23 to be installed. The Kelly bar 26 is inserted in a socket 27 of the Kelly bar adapter 25 and secured thereto by a locking member. The Kelly bar adapter 25 has a flange 28 that can be connected either to the torque indicator 24 or the drive tool 21. A conventional bent arm pin and coil can be used to secure the Kelly bar 26 to the Kelly bar adapter 25.

The torque indicator 24 includes an upper flange 29 connectable to the Kelly bar adapter flange 28 and a lower flange 30 connectable to the drive tool 21. The torque indicator 24 monitors torque during installation of the helical pile 23 such that torque ratings are not exceeded.

The drive tool 21 has a flange 31 having upper and lower surfaces 32 and 33, as shown in FIGS. 2-6. The flange 31 has a plurality of openings 34 for aligning with corresponding openings in either the Kelly bar adapter flange 28 or the torque indicator lower flange 30. The flange openings 34 extend from the upper surface 32 to the lower surface 33 of the flange 31. Fasteners inserted through the aligned openings secure the drive tool to the torque indicator 24 or the Kelly bar adapter 25.

A wall 35 extends downwardly from the flange 31 of the drive tool 21, as shown in FIGS. 2-15. The wall 35 defines a socket 36 for receiving an anchor shaft 23. A second portion 37 of the wall 35 extends axially from a first portion 38 of the wall. The first portion 38 of the wall 35 extends from the lower surface 33 of the flange 31. The second portion 37 extends axially from an end 39 of the first portion 38 of the wall 35. The second portion 38 of the wall 35 has a circumferential or peripheral extent less than that of the first portion 37 to facilitate aligning the anchor shaft 23 with the drive tool 21 and inserting the anchor shaft in the socket 36 by providing a laterally and axially open alignment opening.

Figure 6:
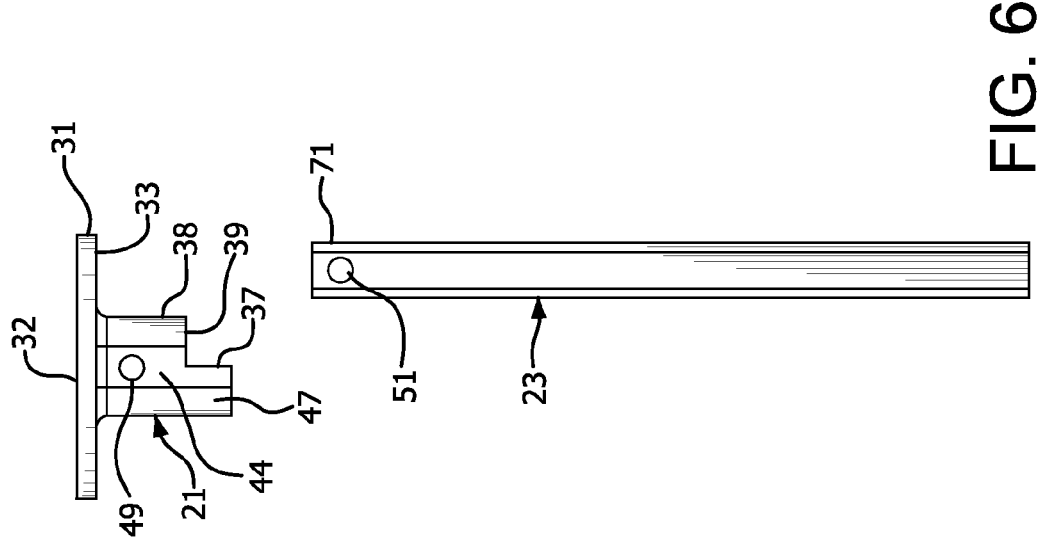
FIG. 6 is a side elevational view of the drive tool and helical pile of FIG. 4.
Figure 5:
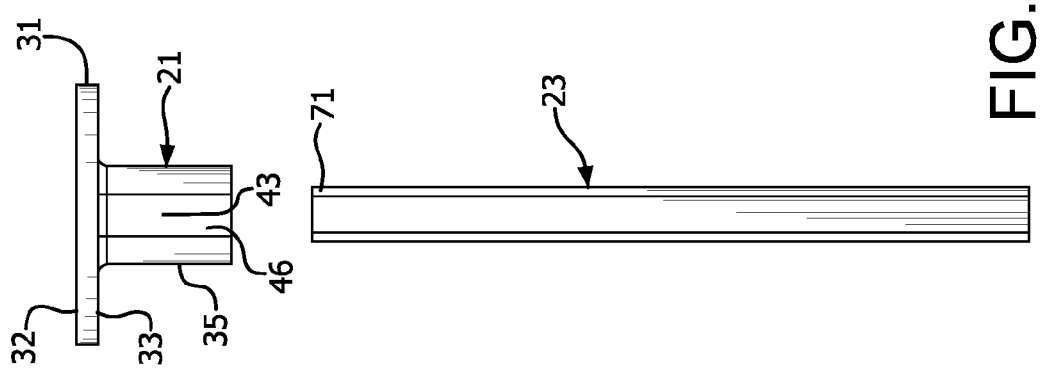
FIG. 5 is a rear elevational view of the drive tool and helical pile of FIG. 4.
Figure 4:
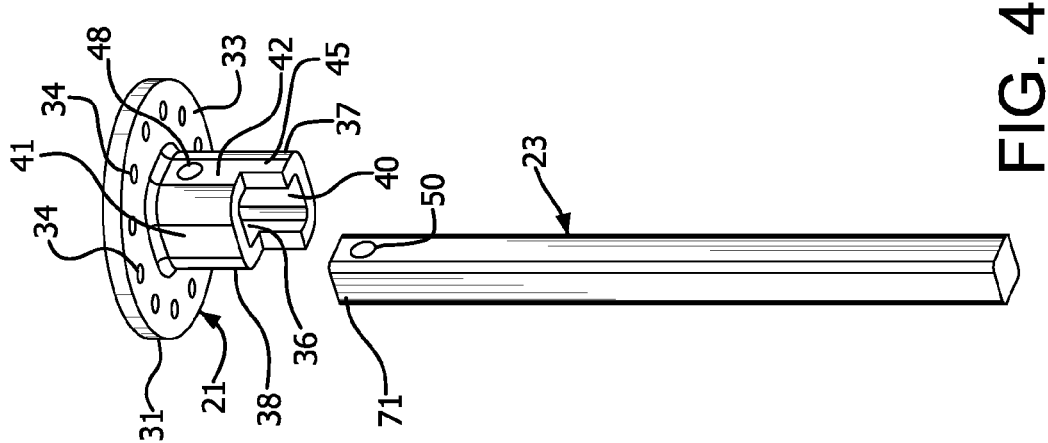
FIG. 4 is a perspective view of the drive tool of FIG. 2 prior to connecting the square helical pile thereto.
Figure 9:
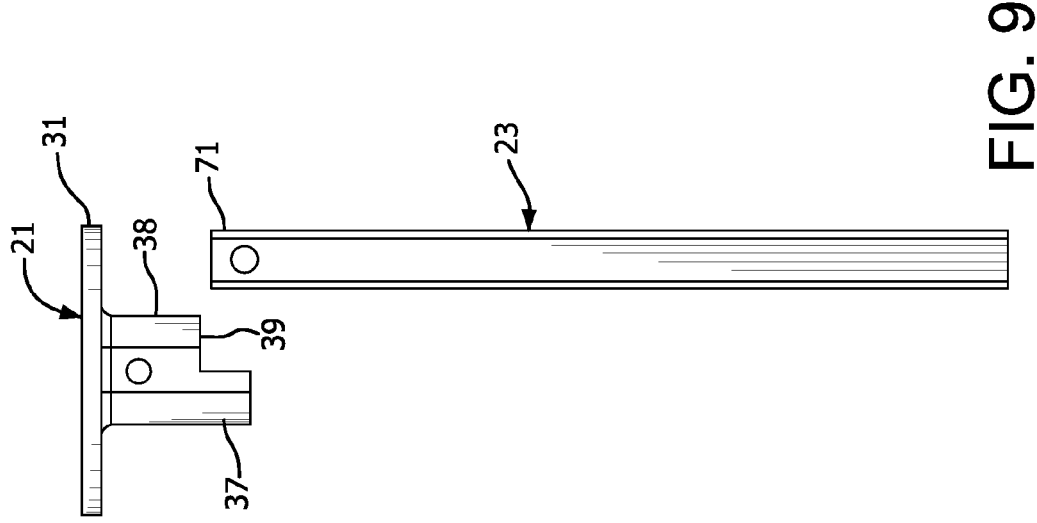
FIG. 9 is a side elevational view of the drive tool and helical pile of FIG. 7.
Figure 8:
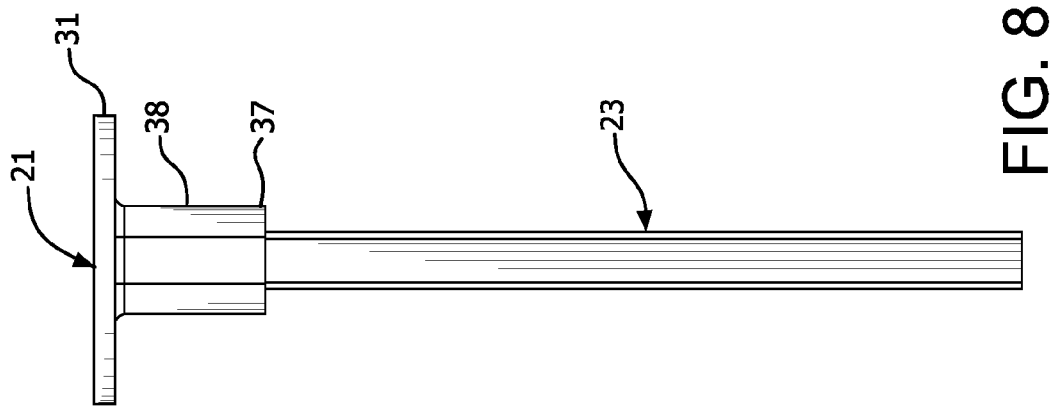
FIG. 8 is a rear elevational view of the drive tool and helical pile of FIG. 7.
Figure 7:
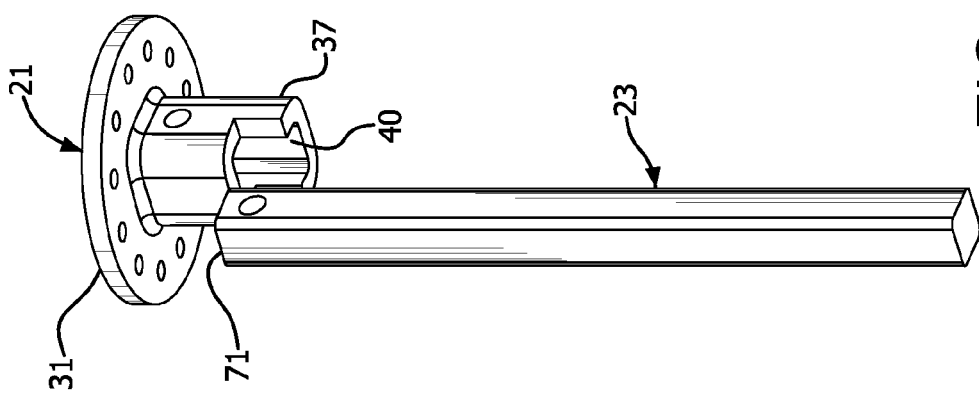
FIG. 7 is a perspective view of the drive tool of FIG. 2 in which the drive tool is lowered to the square helical pile.

As shown in FIGS. 2-15, the wall 35 has a substantially square cross section transverse to the longitudinal axis of the drive assembly 22 and helical pile 23 to define a substantially square socket 36. The wall 35 and socket 36 may be any shape suitable to receive the helical pile 23. As the helical pile 23 has a substantially square cross section, the socket 36 has a substantially square cross section. The wall 35 has first, second, third and fourth sides 41-44, as shown in FIGS. 4-6. To receive a circular helical pile, a socket having a substantially circular cross section transverse to a longitudinal axis is used.

As shown in FIGS. 2-15, the second portion 37 of the wall 35 is substantially C-shaped when viewed from a longitudinal end of the drive tool 21, as shown in FIG. 4. Although shown as being substantially C-shaped in FIGS. 2-15, the second portion of the wall can have any suitable shape as shown in FIGS. 17-27. The second portion 37 has first, second and third sides 45-47, as shown in FIGS. 4-6. The second side 46 of the second portion 37 extends axially downwardly from the third side 43, as shown in FIG. 5. The width of the second side 46 of the second portion 37 is substantially similar to the width of the third side 41 of the first portion 38. The widths of the first and third sides 45 and 47 are smaller than the widths of the second and fourth sides 42 and 44 of the first portion 38 of the wall 35, as shown in FIGS. 4 and 6. The second portion 37 of the wall 35, as shown in FIG. 4, forms an alignment window to facilitate aligning the helical pile 23 with the drive tool 21 and inserting the helical pile in the socket 35.

Openings 48 and 49 in the second and fourth sides 42 and 44, respectively, align with openings 50 and 51 in the helical pile 23 to receive a locking member to secure the helical pile to the drive tool 21. As shown in FIG. 2, the locking member can be a conventional bent arm pin 52 having a coil 53 at an end thereof to prevent accidental removal of the pin from the aligned openings.

Alternatively, as shown in FIGS. 28-30, a drive tool 121 according to another exemplary embodiment of the present invention has a conventional locking dog 151 as the locking member. The drive tool 121 of the second exemplary embodiment is substantially similar to the drive tool 21 of the first exemplary embodiment and similar features are indicated by reference numerals "1xx". Oppositely disposed protrusions 152 and 153 extend outwardly from opposite sides of a wall 135 of the drive tool 121. Although shown with a locking dog 151 disposed in only the first protrusion 152, a second locking dog can be disposed in the second protrusion 153. The protrusions 152 and 153 are shown disposed approximately 180 degrees apart, but any suitable configuration can be used, such as disposed the protrusions 90 degrees apart.

A locking pin 154 is axially and rotatably movable within the locking dog 151. Preferably, the locking pin 154 is substantially perpendicular to a longitudinal axis of the drive tool socket 136. The locking pin 154 is movable between an insertion position and a locking position. A spring member (not shown) biases the locking pin 154 toward the locking position, as shown in FIG. 30, in which a free end 155 of the locking pin 154 extends into the socket 136. In the insertion position, the locking pin 154 is moved out of the socket 136 to allow insertion of the helical pile 23.

The free end 155 of the locking pin 154 has a sloped surface 156. The sloped surface 156 extends upwardly and radially into the socket 136 to allow the helical pile 23 to pass the locking pin 154 during insertion of the helical pile into the socket. An upper surface 157 of the locking pin 154 prevents an installed helical pile 23 from moving the locking pin and accidentally removing the helical pile from the drive tool 121. An opening 158 in a housing 159 of the locking dog receives a set screw (not shown) to further prevent movement of the locking dog 151 when connected to the drive tool 121.

An extension member 54, as shown in FIGS. 3, and 22-24, can be used to extend the length that the helical pile 23 can be screwed in the ground. The extension member 54 is connected between the drive tool 21 and helical pile 23. Any suitable number of extension members 54 can be used to obtain the desired length. The extension member 54 has a body 55 having a first end 56 and a second end 57. The first end 56 is received by the socket 35 of the drive tool 21. The second end 56 of the extension member 54 has a socket member 58 connected thereto to receive the helical pile 23 or another extension member. Preferably, the extension member 54 is unitarily formed as a single piece. Alternatively, the socket member 58 can be welded to the extension member 54. A first opening 63 is formed proximal the first end 56 of the extension member and a second opening 64 is formed proximal the second end 57. The first opening 63 is aligned with the openings 48 and 49 in the drive tool to receive a locking member. The second opening 64 in the extension member 54 is aligned with the openings 50 and 51 in the helical pile 23 (or openings in another extension member) to receive a locking member. Any suitable locking member can be used, such as, but not limited to, the bent arm pin 52 and coil 53, a fastener and nut, or a locking dog 151 (FIGS. 28-30). The extension member 54 is preferably made of steel, although any suitable material can be used.

The socket member 57 has an alignment window formed substantially similarly to the alignment window of the drive tool 21. A first portion 61 of a wall 59 extends axially downwardly from the second end 57 to form a socket 60. A second portion 62 of the wall 59 extends axially from the first portion 61 of the wall 59 and has a circumferential extent less than the first portion to form the alignment window to facilitate connecting the helical pile 23 or another extension member 54 thereto by providing a laterally and axially open alignment opening.

Alternative embodiments of the extension member are shown in FIGS. 16-21 and 25-28. Although such configurations are described with respect to an extension member, such alternative configurations can also be used with the drive tool.

As shown in FIGS. 16-18, a round extension member 254 has a socket member 258 defining a substantially circular socket 260. A second portion 262 extends axially further than a first portion 261 of a wall 259 to form an alignment window. The second portion 262 has a substantially semi-circular cross section and extends approximately 180 degrees, although the second portion 262 can extend any suitable amount to form the alignment window.

As shown in FIGS. 19-21, an extension member 354 has a socket member 358 defining a substantially square socket 360. A second portion 362 extends axially further than a first portion 361 of a wall 359 to form an alignment window. The second portion 362 extends from only one side of the first portion 361 of the wall 359 such that the second portion 362 is substantially planar.

As shown in FIGS. 25-27, an extension member 454 has a socket member 458 defining a substantially square socket 460. A second portion 462 extends axially further than a first portion 461 of a wall 459 to form an alignment window. The second portion 462 has a substantially L-shaped cross section. Each leg of the second portion 462 has a width less than that of the side of the first portion 461 from which it extends.

The drive tools 21 and 121 of the first and second exemplary embodiments are preferably made of steel, although any suitable material can be used. The drive tools 21 and 121 are preferably unitarily formed as a single piece.

Assembly and Operation

The alignment window in accordance with exemplary embodiments of the present invention provides a quick, easy and safe connection between the helical pile 23, drive tool 21 and extension member 54. The alignment window allows the helical pile 23 to be safely aligned with the drive tool 21 prior to insertion of the helical pile, thereby reducing the likelihood of injury to the installer. The exemplary embodiments of the present invention eliminates the difficulty and likelihood of injury associated with bringing two substantially planar ends together, by providing one of the members with an axially extending portion.

Figure 12:
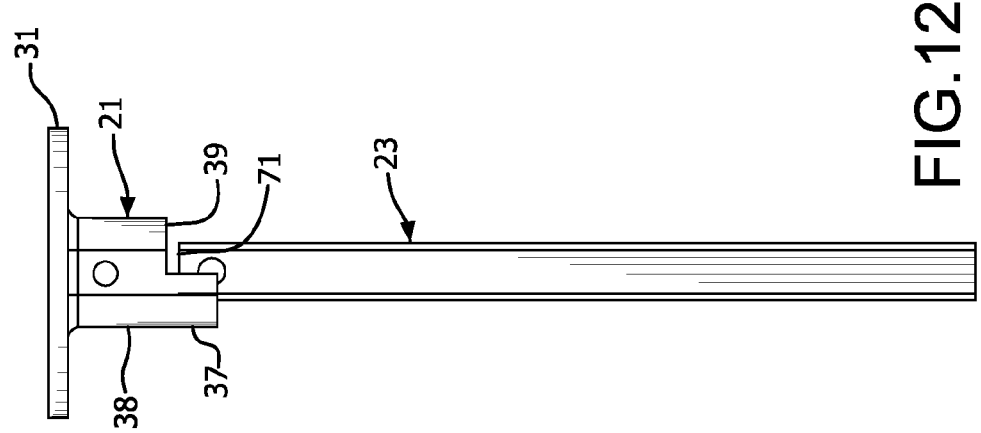
FIG. 12 is a side elevational view of the drive tool and helical pile of FIG. 10.
Figure 11:
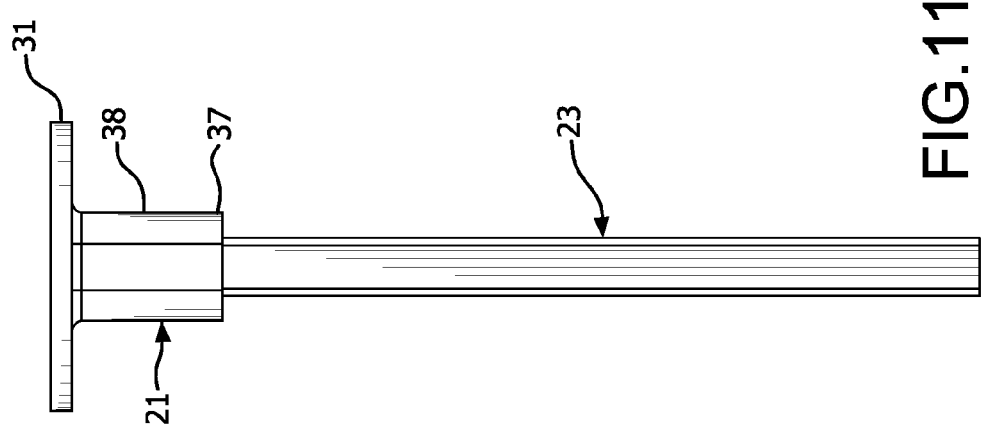
FIG. 11 is a rear elevational view of the drive tool and helical pile of FIG. 10.
Figure 10:
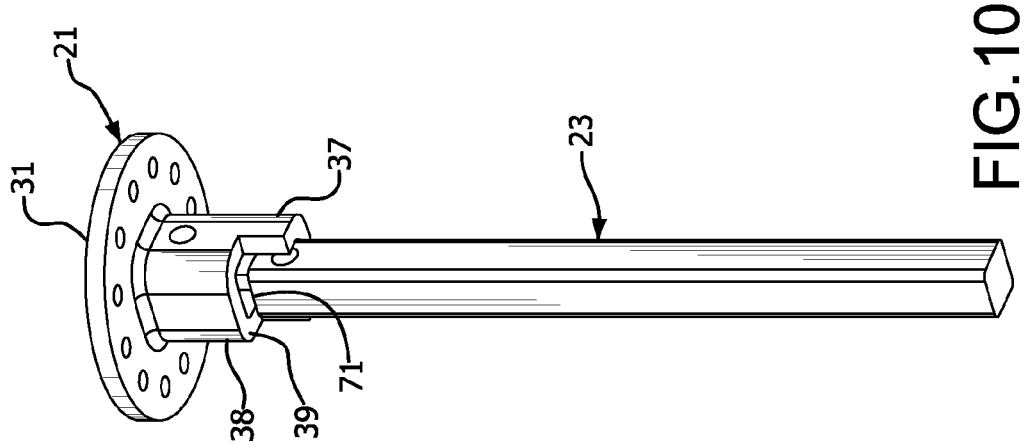
FIG. 10 is a perspective view of the drive tool of FIG. 2 in which the square helical pile is pressed against a surface of the alignment window.

As shown in FIGS. 4-9, the drive tool 21, which is connected to the drive assembly 22 (FIG. 2) is lowered to a position proximal the helical pile 23. An upper end 71 of the helical pile 23 is then brought into alignment with the drive tool 23. The helical pile 23 is pushed into the alignment window such that the upper end 71 of the helical pile 23 engages an inner surface 40 of the second portion 38 of the drive tool 21, as shown in FIGS. 10-12. Because both the drive tool 21 and the helical pile 23 do not have substantially planar ends, the pinch point between the drive tool and the helical pile is substantially eliminated. The axially extending second portion 38, which also has a circumferential extent less than the first portion, of the drive tool 21 acts as a guide to facilitate alignment and insertion of the helical pile 23 with the drive tool 21 and substantially eliminates the pinch points therebetween.

After pressing the upper end 71 of the helical pile 23 against the inner surface 40 of the second portion 38 of the drive tool 21 to align the helical pile with the drive tool 21, the drive tool 21 is lowered onto the helical pile 23 to fully engage the two members as shown in FIGS. 13-15. The openings 50 and 51 (FIGS. 4 and 6) proximal the upper end 71 of the helical pile 23 are now aligned with the openings 48 and 49 of the drive tool 21 such that a locking member can secure the helical pile to the drive tool. As shown in FIG. 2, the bent arm pin 52 and coil 53 can be used to secure the helical pile 23 to the drive tool 21. Alternatively, the locking dog 151 (FIGS. 28-30) can be used to secure the helical pile 23 to the drive tool 21.

A similar procedure is used to connect an extension member 54 between the drive tool 21 and the helical pile 23, as shown in FIG. 3. The extension member has the second portion 62 extending axially further than the first portion 61 of the wall 59 to provide the extension member with an alignment window to easily, quickly and safely align and connect the helical pile 23 or another extension member.

While an advantageous embodiment has been chosen to illustrate the invention, it will be understood by those skilled in the art that various changes and modifications may be made therein without departing from the scope of the invention as defined in the appended claims.

What is claimed is:

1. A drive tool of a drive tool assembly, comprising:
a flange connectable to the drive tool assembly; and
a wall having a first portion extending axially outwardly from said flange and defining a socket for receiving a member, said wall having a second portion extending axially from said first portion of said wall and having a circumferential extent less than said first portion to facilitate receiving the member by providing a laterally and axially open alignment opening.

2. The drive tool according to claim 1, wherein said first portion of said wall has first and second oppositely disposed openings for receiving a locking member to secure the received member to said drive tool.

3. The drive tool according to claim 1, wherein said first portion has a substantially square shape in cross section transverse to a longitudinal axis thereof.

4. The drive tool according to claim 3, wherein said second portion of said wall is substantially C-shaped in cross section transverse to said longitudinal axis.

5. The drive tool according to claim 3, wherein said second portion of said wall is substantially L-shaped in cross section transverse to said longitudinal axis.

6. The drive tool according to claim 3, wherein said second portion of said wall extends from only one side of said first portion of said wall.

7. The drive tool according to claim 1, wherein said first portion of said wall has a substantially circular shape in cross section transverse to a longitudinal axis thereof.

8. The drive tool according to claim 7, wherein said second portion of said wall extends circumferentially between approximately 90 and approximately 180 degrees.

9. The drive tool according to claim 1, wherein locking dogs connected to said first portion of said wall secure the received member to said drive tool.

10. The drive tool according to claim 1, wherein said drive tool is unitarily formed as a single member.

11. The drive tool according to claim 1, wherein said member is an extension member having a socket formed at an end thereof to receive an anchor shaft, said socket having a first portion and a second portion extending axially further than said first portion and having a circumferential extent less than said first portion thereof to facilitate receiving the anchor shaft by providing a laterally and axially open alignment opening.

12. An extension member for connecting a helical pile to a drive tool, comprising:
a body having first and second ends, said first end being connectable to the drive tool;
a socket having a first portion formed at said second end of said body connectable to the helical pile; and
a second portion of said socket extending axially from said first portion and having a circumferential extent less than said first portion thereof to facilitate receiving the helical pile by providing a laterally and axially open alignment opening.

13. The extension member according to claim 12, wherein said first portion has a substantially square shape in cross section transverse to a longitudinal axis thereof.

14. The extension member according to claim 13, wherein said second portion of said wall is substantially C-shaped in cross section transverse to said longitudinal axis.

15. The extension member according to claim 13, wherein said second portion of said wall is substantially L-shaped in cross section transverse to said longitudinal axis.

16. The extension member according to claim 13, wherein said second portion of said wall extends from only one side of said first portion of said wall.

17. The extension member according to claim 12, wherein said first portion has a substantially circular shape in cross section transverse to a longitudinal axis thereof.

18. The extension member according to claim 17, wherein said second portion of said wall extends circumferentially approximately 90 and approximately 180 degrees.

19. A method of connecting a member to a drive tool, comprising the steps of
abutting a first member against an axially extending portion of the drive tool by moving the first member axially and laterally, the axially extending portion having a circumferential extent less than a socket portion from which the axially extending portion extends;
inserting the first member in the socket portion of the drive tool by axial movement after engagement of the first member and the axially extending portion; and
locking the first member in the socket portion.

20. The method of connecting a member to a drive tool according to claim 19, further comprising
abutting a second member against an axially extending portion of the first member, the axially extending portion of the first member having a circumferential extent less than a socket portion of the first member from which the axially extending portion of the first member extends;
inserting the second member in the socket portion of the first member; and
locking the second member to the first member.

* * * * *